United States Patent [19]

Butterfield et al.

[11] Patent Number: 4,567,790
[45] Date of Patent: Feb. 4, 1986

[54] MOTION TRANSMITTING SYSTEM

[75] Inventors: Roger P. Butterfield, Interlaken; Charles M. Allaben, Jr., Ithaca, both of N.Y.

[73] Assignee: Emerson Electric Company, St. Louis, Mo.

[21] Appl. No.: 630,940

[22] Filed: Jul. 16, 1984

Related U.S. Application Data

[63] Continuation of Ser. No. 453,065, Dec. 27, 1982, abandoned, which is a continuation-in-part of Ser. No. 322,615, Nov. 18, 1981, Pat. No. 4,471,672.

[51] Int. Cl.$^4$ ............................................. F16H 1/28
[52] U.S. Cl. ..................................................... 74/804
[58] Field of Search ................. 74/804, 805, 801, 802, 74/803, 785, 789; 188/82.1, 82.74, 82.77, 82.84

[56]           References Cited
        U.S. PATENT DOCUMENTS

| | | | |
|---|---|---|---|
| 1,694,031 | 12/1928 | Braren | 74/804 |
| 2,170,951 | 8/1939 | Perry | 74/804 |
| 2,508,121 | 5/1930 | McIver | 74/804 |
| 2,603,322 | 7/1952 | Dunn | 188/82.1 |
| 3,019,594 | 2/1962 | Sundt | 74/804 |
| 3,448,638 | 6/1969 | Zahlaus | 74/804 |
| 3,979,167 | 9/1976 | Grove | 74/805 X |
| 4,023,440 | 5/1981 | Kennington et al. | 74/804 |
| 4,050,331 | 9/1977 | Braren | 74/804 |
| 4,117,746 | 10/1978 | Pierrat | 74/804 X |
| 4,177,695 | 12/1979 | Grove | 74/804 |
| 4,194,415 | 3/1980 | Kennington et al. | 74/805 |
| 4,282,777 | 8/1981 | Ryffel et al. | 74/804 |
| 4,297,920 | 11/1981 | Richter | 74/804 |
| 4,471,672 | 9/1984 | Butterfield et al. | 74/804 |

FOREIGN PATENT DOCUMENTS

| | | | |
|---|---|---|---|
| 459025 | 4/1928 | Fed. Rep. of Germany | 74/804 |
| 973323 | 2/1951 | France | 74/804 |

Primary Examiner—Leslie A. Braun
Assistant Examiner—Stephen B. Andrews
Attorney, Agent, or Firm—Philip B. Polster; Aubrey L. Burgess

[57]           ABSTRACT

A motion transmitting device having an input shaft and a concentric output shaft assembly, and an eccentrically rotated gear driven by the input shaft to provide an eccentric output. The gear has teeth which engage and subsequently disengage with independently movable meshing elements, such as pins. A pair of datum members have round holes to individually guide and limit movement of the meshing elements within predetermined limits of orbital motion relative to the datum members. The eccentric output drive of the gear is converted to rotary motion of the output shaft assembly. The input shaft and the output shaft assembly are rotatable about a common axis.

4 Claims, 8 Drawing Figures

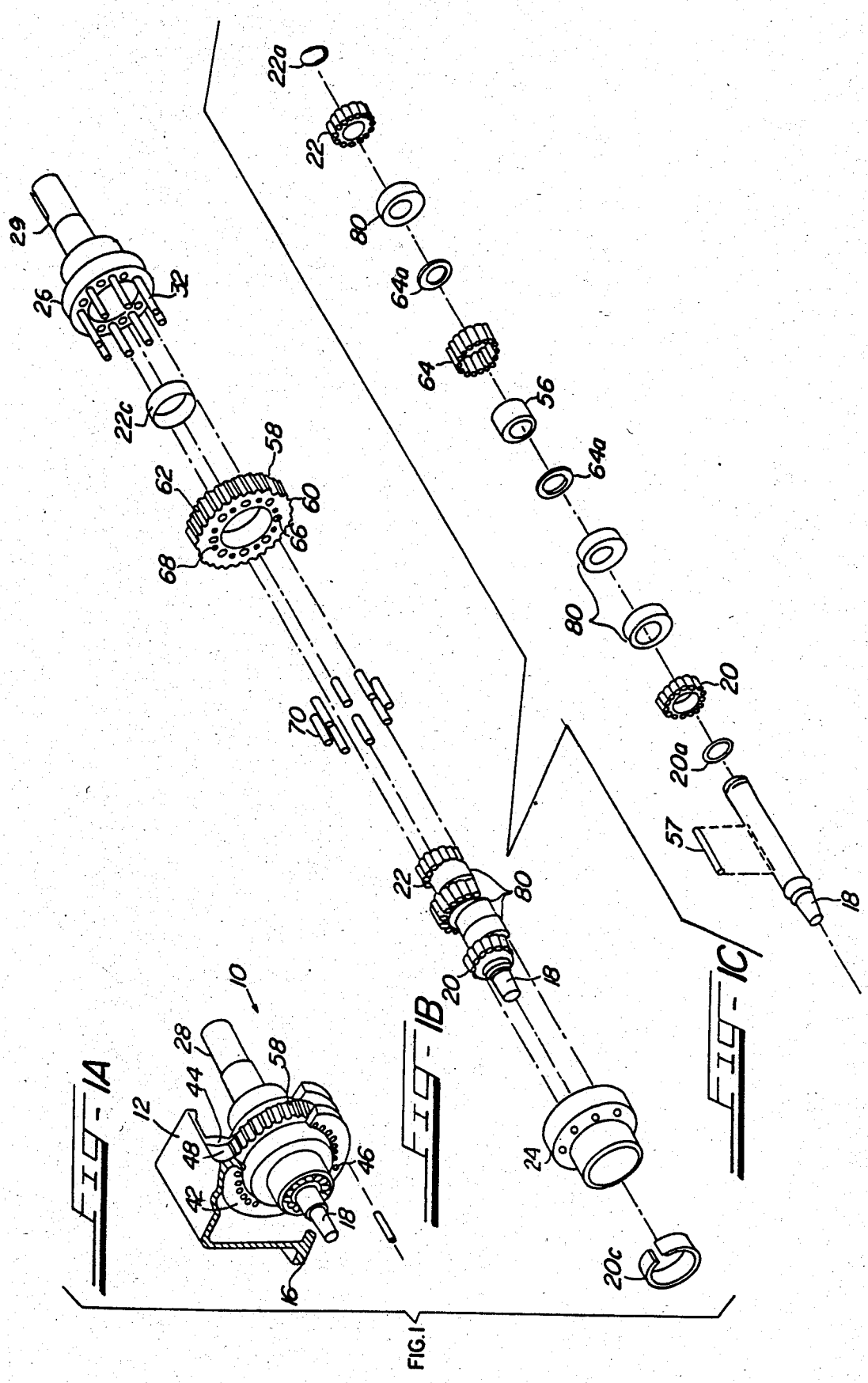

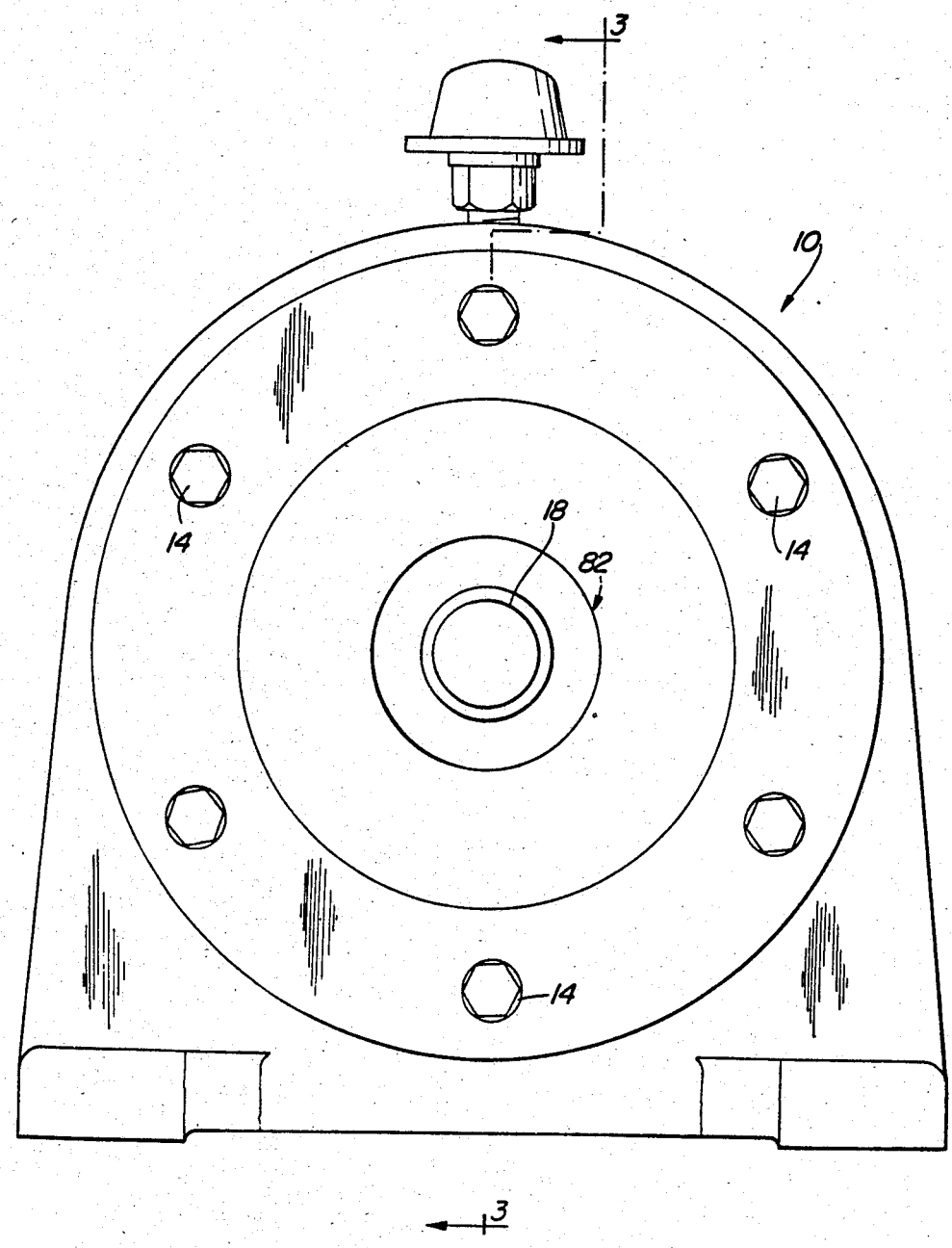

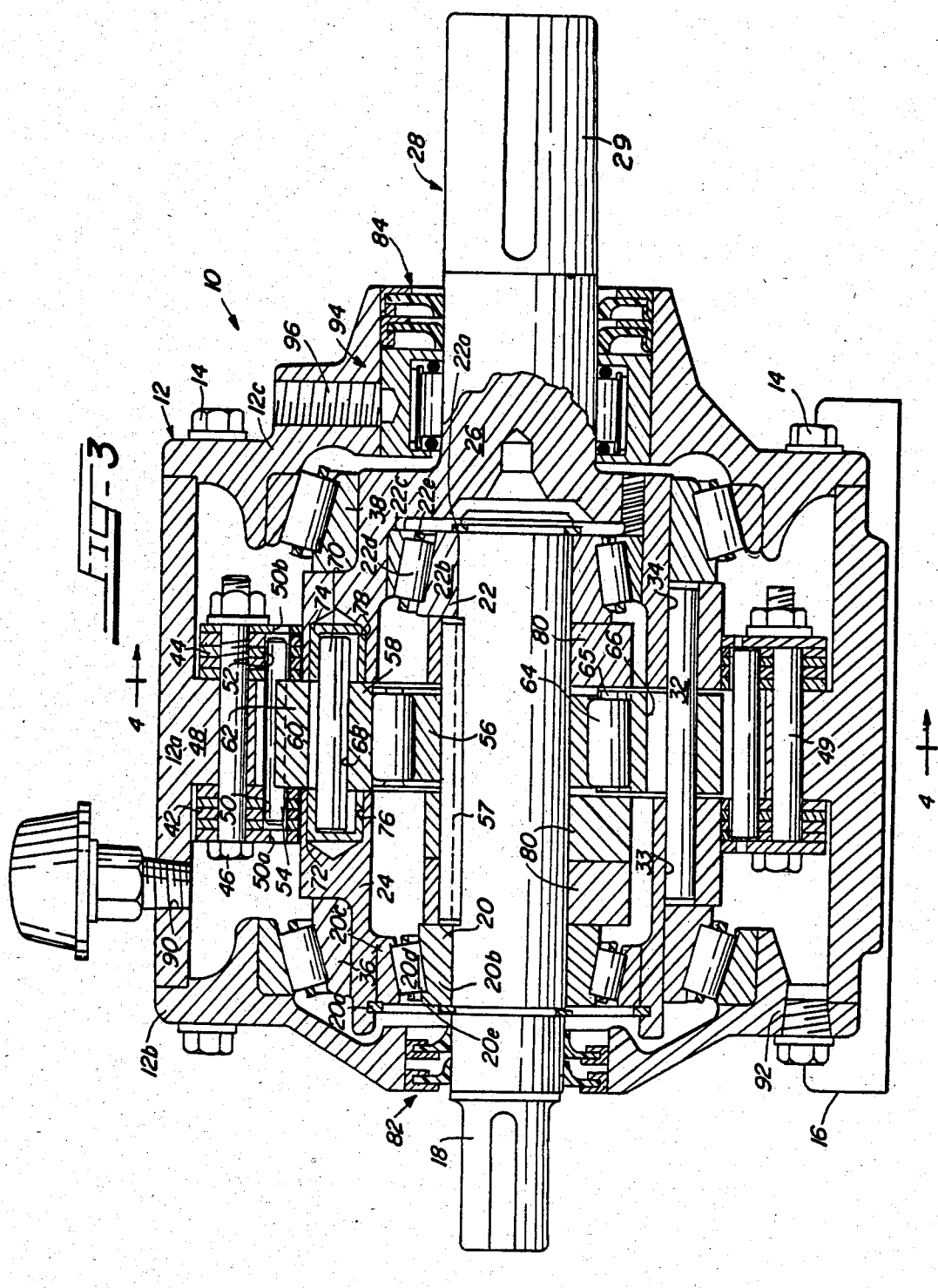

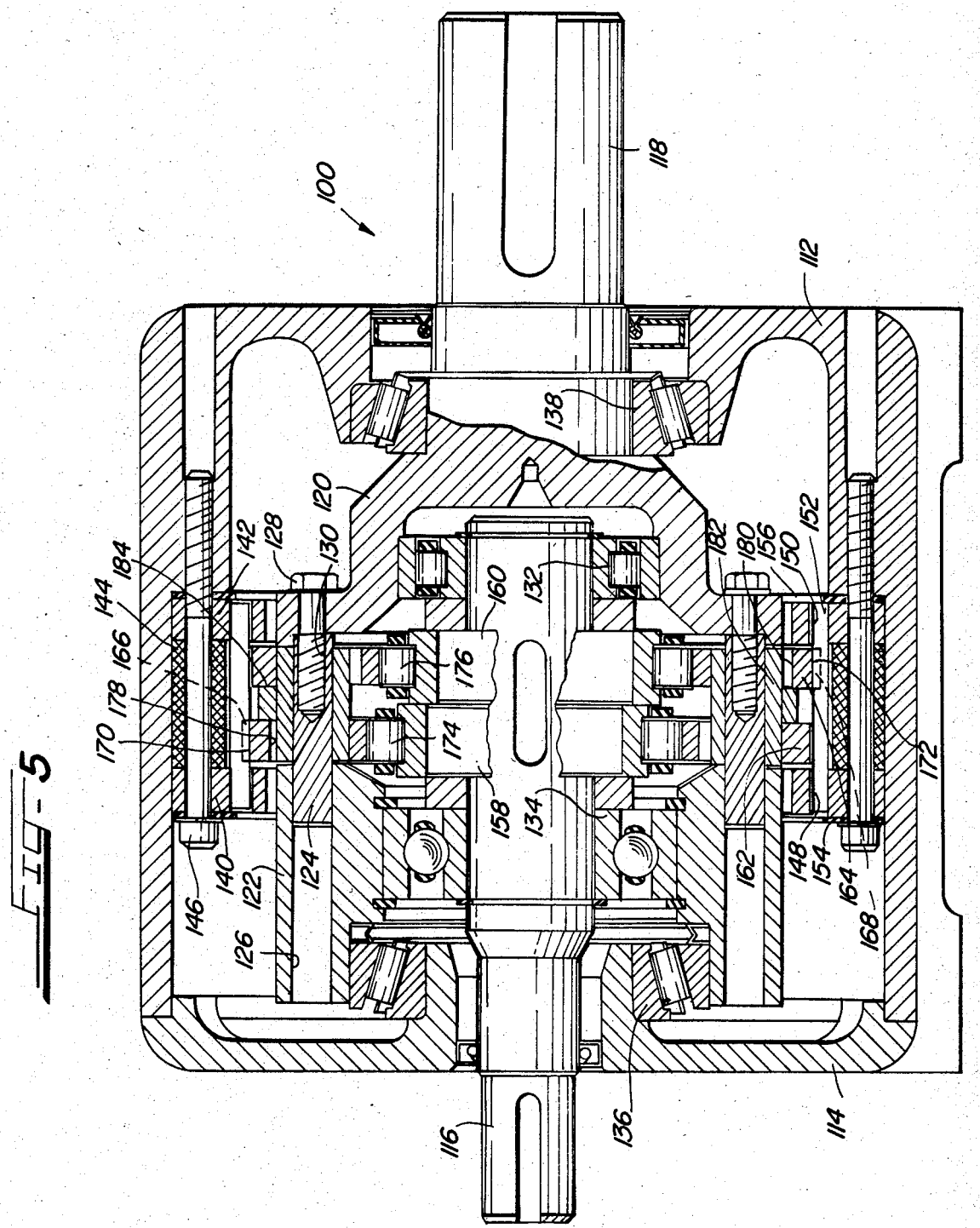

MOTION TRANSMITTING SYSTEM

CROSS-REFERENCE TO RELATED APPLICATIONS

This application is a continuation application of our application Ser. No. 453,065, filed Dec. 27, 1982, and entitled "MOTION TRANSMITTING SYSTEM", now abandoned, which was a continuation-in-part of our copending application, Ser. No. 322,615 filed Nov. 18, 1981 and entitled "MOTION TRANSMITTING SYSTEM" now U.S. Pat. No. 4,471,672 issued Sept. 18, 1984.

BACKGROUND OF THE INVENTION

Motion transmitting and speed changing devices having an input member, an output member driven by a gear means through a coupling which transforms eccentric motion to rotary motion, and the input member driving the gear means through an eccentric, are known in the art. Examples of motion transmitting devices in which the gear means meshes with meshing elements having limited movement are illustrated in U.S. Pat. Nos. 4,023,440 and 4,194,415 granted May 17, 1977, and Mar. 25, 1980, respectively. These drives are known as "Quadrant Drives" because the driving engagement of the gear means and the meshing elements is through an arc of substantially 90°. In these patents, the meshing elements are linked together, and ovoid holes in one or more datum members or capturing plates flanking the gear means comprise the movement limiting means. Drives of the type described generally use an Oldham coupling to convert the eccentric output to the rotary motion.

A suggestion has been made in a motion transmitting device to support an output shaft in bearings disposed in a cup-like portion of an input shaft which is in turn journalled in a bearing supported by the housing, the output shaft being driven by a coupling which includes a generally circular disc-like rotor attached to the output shaft, and driven by pins extending from the rotor member in turn driven by an eccentric gear which provides a reduction drive.

SUMMARY OF THE INVENTION

The invention herein described relates to a motion transmitting device or speed changing device similar in some respects to the "Quadrant Drives". However, the need for a coupling to convert eccentric motion to rotary motion, such as an Oldham coupling, is eliminated. A more compact motion transmitting device is provided, described as a "close-coupled" drive. In the drive system of this invention, the input shaft and output shaft are coaxial, and in the preferred embodiment, the input shaft and output shaft assembly are concentric about a common axis and are generally co-planar. The output shaft assembly surrounds the input shaft, at least in part. The input shaft is journalled in bearings at two locations in the output shaft assembly. Because of the construction of the output shaft assembly, it too, is journalled in a pair of spaced bearings supported by the housing.

The drive system in one embodiment of this invention comprises a gear driven from an eccentric on the input shaft with its teeth meshing with independently movable meshing elements. Movement limiting means limit motion of the meshing elements, the limiting means being openings or holes in at least one datum member of a capturing plate flanking the gear. The motion limiting means, i.e., the openings or holes in the datum members, according to one aspect of this invention, are round instead of ovoid, and the gear is formed with semi-circular tooth spaces to mesh with the meshing elements. Round holes in the datum members are easily formed and do not require precision manufacturing techniques as required for the forming of ovoid holes as taught by the prior art patents noted above. The system of this invention is so constructed that the motion of the meshing elements relative to the motion limiting means is substantially pure rolling motion. With rolling motion, frictional losses are minimized.

In the preferred embodiment, the gear is disposed between two datum members having aligned opposite openings for the meshing elements. The datum members or capturing plates are fixedly attached to a housing for the drive system. To achieve a difference in speeds of the input and output shafts, the drive system is provided with at least one more meshing element than there are gear teeth.

In another embodiment of this invention, two gears are disposed between the datum members, each gear being driven by an eccentric. In this embodiment, the eccentrics are essentially 180° out of phase, so that the assembly is substantially in balance without the use of counterweights, required in the single gear embodiments.

The coupling arrangement of this invention utilizes an output shaft assembly driven by the gear and, is usable with generally any drive mechanism having a single eccentrically driven member and an output shaft, as for example, those drives in which the teeth of an eccentric sprocket mesh with the teeth of an internal gear.

BRIEF DESCRIPTION OF THE DRAWINGS

FIG. 1A is a perspective view, partially broken away, illustrating a part of the housing, datum members and drive assembly of this invention;

FIG. 1B is an exploded, perspective view, illustrating the major parts of the drive assembly;

FIG. 1C is another exploded, perspective view illustrating other portions of the drive assembly;

FIG. 2 is an end view of the motion transmitting system of this invention;

FIG. 3 is a longitudinal sectional view, taken on line 3—3 of FIG. 2, of the inventive system;

FIG. 5 is a longitudinal sectional view through a two gear motion transmitting system of this invention.

DESCRIPTION OF THE PREFERRED EMBODIMENTS

Figure 4A:
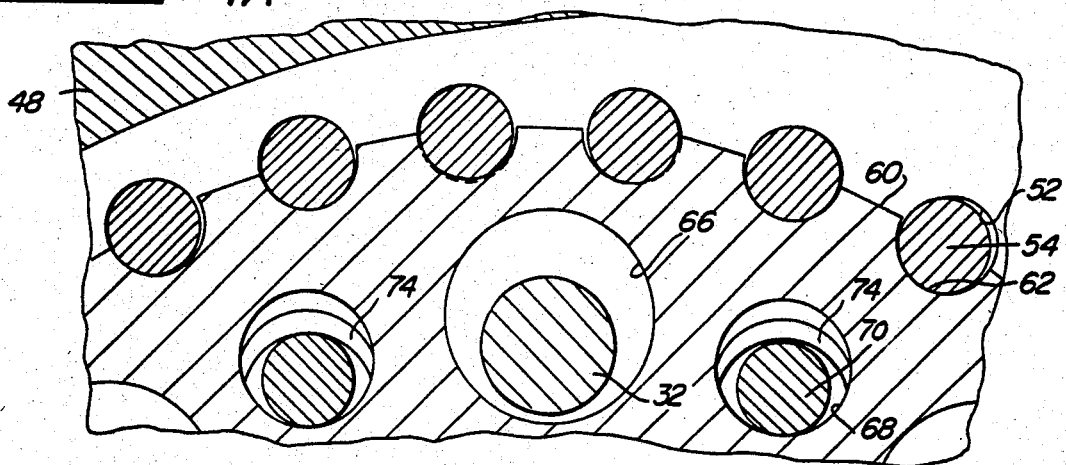
FIG. 4A is a partial sectional view, depicting a portion of FIG. 4, and enlarged to show details.
Figure 4:
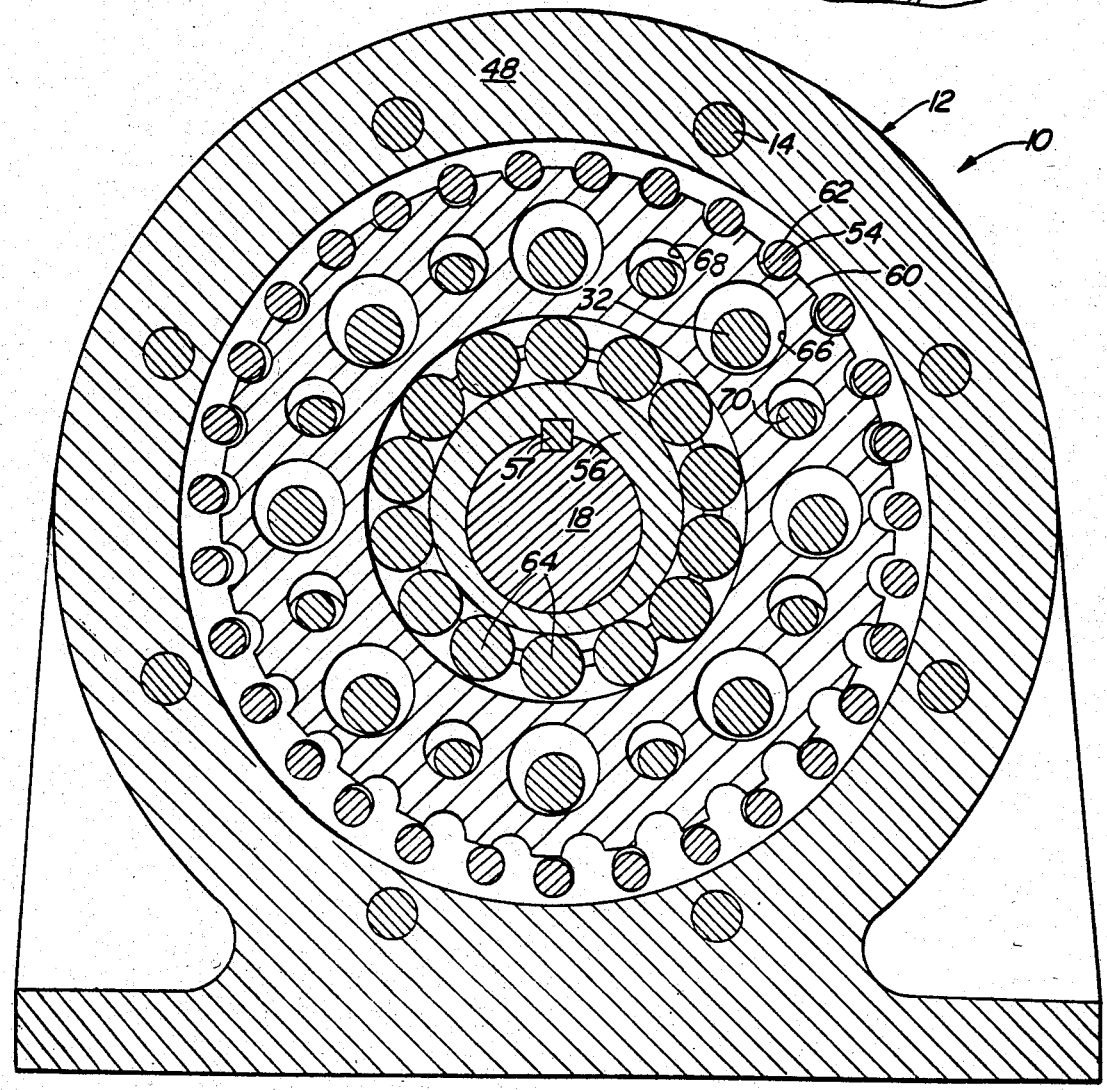
FIG. 4 is a sectional view taken on line 4—4 of FIG. 3.

The general path of rotary motion transmission from input to output will first be described in connection with FIGS. 1B and 3. The motion transmitting system of the invention includes a rotatable input member 18, on which an eccentric 56 is fastened. A gear 58 is mounted on eccentric 56, so that gear 58 is eccentrically rotated as input member 18 is rotated. An output shaft assembly 28 includes two sections or subassemblies 24 and 26, and an output shaft extension 29. A plurality of coupling pins 70 extend through correspondingly shaped holes 68 of gear 58, and into suitably bored portions of sleeve section 24 and cup-like section 26 of the output shaft assembly. Accordingly, it is apparent that output shaft member 29 is rotated as input shaft 18 is driven, over the path including eccentric 56, gear 58, coupling pins 70, sections 24 and 26 of output shaft assembly 28, and output shaft 29 of the same assembly. With this summary of motion transmission, a detailed mechanical description and teaching of the speed modification through the system will now be set out.

In more detail, the motion transmitting device or drive system illustrated in the drawings and identified as 10, comprises end covers 12b and 12c (FIG. 3), the parts of which are connected by one or more machine bolts 14. The center section 12a is provided with a base 16 for fixing the device to a support.

Input shaft 18 is journalled for rotation in spaced bearing assemblies 20 and 22, the bearing assemblies supported in parts or sections 24 and 26 of output shaft assembly 28 which also includes output shaft member 29. Of the two parts, one is a sleeve-like part 24 and the other is a cup-like part 26; these parts or sections are rotatably joined by one or more connecting rods 32 press fitted in openings 33 and 34 in the shaft parts 26 and 24, respectively. The bearing assembly 20 is suitably secured on input shaft 18 by a snap ring 20a. Bearing 20 comprises an inner race 20b, an outer race 20c and a plurality of tapered rollers 20d, the latter being spaced apart by a cage 20e. The bearing assembly 22 is located on the shaft 18 by a snap ring 22a. Assembly 22 comprises an inner race 22b, an outer race 22c, and a plurality of tapered rollers 22d, the latter being spaced by a cage 22e. The subassemblies 24 and 26 which support the input shaft are journalled in bearing assemblies 36 and 38, respectively, supported in the housing 12. The bearing assemblies 36 and 38, because of the relationship of the input and output shafts, also support the input shaft. Each bearing assembly comprises an inner and outer race with a plurality of rollers therebetween, the rollers being spaced by a cage. The bearing assemblies 20, 22, 36, and 38 are shown as being of the tapered roller variety, it being understood that other types of bearings can be used if necessary or desirable. It is to be noted that input shaft and the output shaft assembly 28 are coaxial, concentric and, in the preferred embodiment, the output shaft assembly surrounds at least a part of the input shaft within the housing.

A pair of spaced, ring-like datum members or capturing plates 42 and 44 are held in the housing 12 by bolts 46, being spaced by a ring-like datum spacer portion 48 of the housing part 12a. One or more locating pins 49 insure the proper location of the datum members in the housing. The datum members 42 and 44 are provided with a plurality of evenly spaced motion limiting means in the form of round openings or holes, 50, 52, respectively, the holes in one datum member being opposite and axially aligned with those in the other datum member. The datum members 42, 44 are illustrated as being constructed of plurality of relatively thin members which are assembled together, it being understood that each datum member can be a single element, but the thin members can be easily stamped, thus eliminating more expensive machining of the single members. An independently movable drive pin or meshing element 54 is located in each set of opposing openings or holes, the holes being larger than the cross-section of the pins 54 and limiting or restricting the rolling motion of the pins 54. Thus the datum members can be considered as movement limiting means, as holes 50, 52 limit the motion of meshing elements 54 when the system operates. The system is designed to insure a rolling motion of the meshing elements or pins 54 in the holes 50, 52. The outermost plates of the datum members act as stops for the pins 54 because the holes 50a and 50b are of smaller diameter than the holes 50, 52. The holes 50a and 50b permit the passage of lubricant to the pins.

Eccentric 56 is keyed by a key 57 to input shaft 18, and is surrounded by a motion producing device herein illustrated as a gear or sprocket 58 located between the datum members 42, 44. Gear 58 has teeth 60 separated by arcuate spaces 62 for engaging and subsequently disengaging drive pins 54 as the eccentric is rotated by the input shaft. The gear spaces 62 are each defined by a semi-circular surface (see especially FIG. 4a). The combination of round holes 50, 52, round pins 54 and semi-circular surfaced spaces 62 on the meshing gear insure pure rolling motion of the pins 54 in the holes 50, 52. As the gear engages the drive pins, the gear also rotates about its axis which is eccentric to the axis of the input shaft.

The number of drive pins 54 is at least one more than the number of gear teeth 60, which causes the gear to rotate at a speed which is less than that of input shaft, the speed ratio being expressed as $$\frac{n}{N-n}$$

where n equals the number of gear teeth and N equals the number of drive pins. A roller bearing assembly 64 is located between the eccentric 56 and the gear 58. The bearing 64 is retained by a bearing retainer 65 which comprises ring-like members at opposite sides of the bearing. The gear 58 is provided with spaced clearance holes 66 and alternate, smaller spaced holes 68, the holes 66 permitting the passage of the connecting rods 32 and the holes 68 each receiving a coupling pin 70. The coupling pins or motion producing means 70 are rotatably received in cup-like hardened bushings 72 and 74 in opposed openings 76 and 78 in the output shaft parts 24 and 26, respectively. The use of hardened bushings 72, 74 eliminates the necessity of hardening the output shaft assembly 26 without affecting the functioning of the above. The centers of holes 66 and 68 are on a circle which is concentric with respect to the gear 58.

To provide for smooth rotation of the input shaft 18, a counterweight assembly 80 is keyed by key 57 to the shaft 18 with portions on both sides of the eccentric 56. The ends of housing 12 can be dirt sealed by suitable sealing means identified at 82 and 84, the dirt seals being shown as double seals. The dirt seals are shown as being ringlike elastomeric members which wipe against the shaft, it being understood that other known types of dirt seals can be used if so desired. An inlet 90 and a drain 92 are provided to fill and drain the housing 12 with a lubricant, such as oil, as necessary. The inlet and drain are suitably closed by plugs, as illustrated. The dirt seals as illustrated also function to retain the lubricant in the housing. Eccentric 58 and counterweight assembly 80 may be integral with the shaft 18 if so desired.

In the embodiment illustrated, a one-way brake 94, is supported by the housing 12, and surrounds the output shaft member 29. Brake 94 is fixed in position by a set screw 96, as illustrated. The brake 94 overruns when the device is operational and prevents reverse rotation in the event of power loss which could result in damage to the assembly. Also, the brake protects the assembly from overload in the reverse direction, if such occurs. In the event the device is to be used as a speed increaser instead of a speed reducer, shaft 18 would be connected as the output shaft, and output assembly 24, 26, 29 connected as the input shaft. In this case, one-way brake 94 would be placed on the opposite end of the device, on shaft 18, and would operate in the same manner as explained above.

The arrangement just described can be constructed to be very compact. Additionally, all the load on the eccentric bearing is kept in a single plane.

Sections 24 and 26 of output shaft assembly 28 are supported by bearings 36 and 38 at locations which are spaced from each other. The support for output shaft assembly 28 is accomplished because of the connecting rods 32 which connect the sections 24 and 26 of the output shaft assembly 28. Rods 32 pass through holes 66 in gear 58 without interfering with the functions of the gear. By spacing the bearings supporting the output shaft assembly as shown, the load on the bearings is generally evenly distributed. The bearings also take any thrust loads on the shafts.

The drive pins 54 roll around the round holes 50 and 52, which minimize friction losses. Round holes 50 and 52 in the capturing plates 42 and 44 and round teeth spaces 62 in the gear 58 are relatively simple to form, requiring no complex geometry or equations as do ovoid holes and tooth space geometry. The use of laminated capturing plates 42 and 44 simplifies their production, because the plates or laminates and the holes therethrough can easily be stamped in one operation from sheet metal.

FIG. 5 illustrates a drive system 100 comprising a cup-like housing 112 to which is suitably connected an end plate 114, the housing having therein the motion transmitting device system as will be described.

The drive system 100 further comprises a drive shaft 116 and an output shaft assembly 118, the latter being formed of a cup-like part 120 and a sleeve part 122 connected by rigid plugs 124 friction or press-fit into holes 126 in the sleeve part and bolts 128 passing through the cup-like part 120 and into tapped holes 130 in the plugs 124. The input shaft 116 is journalled in spaced bearings 132 and 134 supported by the output shaft assembly parts 120 and 122, respectively. Bearing 132 is illustrated as a roller bearing while bearing 134 is illustrated as a ball bearing.

The output shaft part 122 is supported by a bearing 136 which, in turn, is supported by the end plate 114. Output shaft part 120 is journalled in a bearing 138 supported in the housing 112. Bearings 136 and 138 are illustrated as tapered roller bearings. It should be understood that different types of bearings can be used, so long as they perform the necessary functions.

A pair of ring-like datum members 140, 142 spaced by an annular spacer 144 are held in housing 112 and against rotation by bolts 146. The datum members 140, 142 are similar to those illustrated in FIG. 1A. The datum members 140, 142 are provided with a plurality of evenly spaced motion limiting means in the form of round openings or holes 148 and 150, respectively, the holes in one datum member being opposite and axially aligned with those in the other datum member. An independently movable drive pin or meshing element 152 is located in each set of opposing openings or holes, the holes being larger than the cross-section of the drive pins 152. Thus the datum members can be considered as movement limiting means, as holes 148 and 150 limit the motion of meshing elements 152 when the system operates. The system is designed to insure rolling motion of the meshing elements 152 in the holes 148, 150. Annular plates 154 and 156 abutting the sides of the datum members 142, 144 and held in position by the bolts 146 act as stops for the pins 152; the plates 154 and 156 are of such size to permit the passage of lubricant into the holes 148 and 150.

A pair of eccentrics 158 and 160 are suitably keyed to input shaft 116 and are 180° out of phase with one another. Eccentric 158 is surrounded by a motion producing device illustrated as a gear or sprocket 162, and eccentric 160 is surrounded by a motion producing device illustrated as a gear or sprocket 164. The gears or sprockets 162 and 164 are alike and are formed with teeth 166, 168 separated by arcuate spaces 170, 172, for engaging and subsequently disengaging drive pins 152 as the eccentrics are rotated by the input shaft 116. A roller bearing 174 is interposed between eccentric 158 and gear 162, and a roller bearing 176 is interposed between eccentric 160 and gear 164. These bearings, which could be of other types if desired, permit the gears to rotate about their axes relative to the eccentrics while being rotated by the eccentrics. Each of the gear spaces 170, 172 are defined by a semi-circular surface, similar to that illustrated in FIG. 4A.

The number of drive pins is at least one more than the number of gear teeth 166 and 168, which causes the gear to rotate at a speed which is less than that of the input shaft, in the same manner as previously described. The use of the two gears serves to increase the torque capacity of the unit when compared with that of a single gear. The opposed eccentrics balance the unit and eliminate the need for counterweights.

Each gear is provided with a plurality of spaced holes 178 and 180, the holes being equidistant from the centers of the gears. The plugs 124 pass through the holes 178 and 180 and are each surrounded by a rotatable sleeve or bushing 182. The rotation of the gears is translated to the output shaft 118 by the plugs 124 and the bushings. Suitable seals are used to retain lubricant in the unit. A spacer 184 is positioned around the bushings 182 and between the gears 162 and 164.

OPERATION

As input shaft 18 is rotated, eccentric 56 is turned and the gear or sprocket 58 is forced to roll around while engaging drive pins 54, resulting in a slow speed rotation about its axis, as well as a high speed gyration around the shaft 18. The orbital motion of the gear is converted to rotary motion of output shaft assembly 28 by coupling pins 70 extending through holes 68. The coupling pins 70 transmit torque from gear 58 to the output shaft assembly 28, engaging assembly sections 24, 26. The diameter of each hole 48 is essentially equal to the diameter of coupling pins 70 plus the amount of eccentricity of gear 58 (caused by eccentric 56), to insure that the motion of the coupling pins is pure rolling motion, i.e., the pins 70 roll around the holes as the gear gyrates. In this way, the rotation of the gear is transferred to the output shaft subassemblies while the gyration of the gear is not so transferred. The rolling motion of the pins in the holes results in a very high efficiency device, generally higher than that of conventional pin type couplings in which the pins slide around the hole diameter or within supporting bushings and the like, because frictional losses are minimized.

We claim:

1. A motion transmitting system comprising:

an input shaft and an output shaft;

said output shaft comprising a cup-like part and a spaced, rigidly connected sleeve part surrounding and supporting said input shaft, said input shaft also being supported by said cup-like part;

a first eccentric connected to said input shaft and rotatable therewith;

a first sprocket freely rotatable on said first eccentric, said first sprocket having a plurality of teeth with tooth spaces therebetween, the spaces being defined primarily by a segment of a circle;

a second eccentric connected to said input shaft and rotatable therewith;

a second sprocket freely rotatable on said second eccentric, said second sprocket having a plurality of teeth with tooth spaces therebetween, the spaces being defined primarily by a segment of a circle;

each sprocket having a plurality of spaced generally circular holes therethrough located radially between said eccentric and said tooth spaces;

said first and second eccentrics being 180 degrees out of phase with one another;

a pair of fixed plates, spaced from each other and each defining an array of circular openings opposite a corresponding array of openings in the other plate;

a plurality of cylindrical reaction means in the form of pins extending between and supported in opposite openings of said arrays of openings, said reaction means being circular in cross-section and having a diameter less than said openings;

means including said fixed plates for retaining said reaction means in captive relationship while permitting said reaction means to rotate about their axes while rolling in a circular path in their supporting openings, thereby permitting the distance between the axes of adjacent reaction means to vary during reactive engagement with said first and second sprockets, each circular opening being substantially equidistant from the axis of rotation of said input shaft, the number of reaction means exceeding by at least one the number of teeth of each sprocket, the eccentric rotation of said sprockets permitting some of said sprocket tooth spaces of each sprocket to engage a like number of reaction means and thus impart rotary motion to said sprockets; and means connecting said sprocket and said output shaft to translate rotary motion of said sprockets to rotary motion of said output shaft, said connecting means comprising means passing through the holes in said sprockets and connecting said output shaft cup-like part and said sleeve, whereby the rotational speed of said output shaft is different from that of said input shaft.

2. A motion transmitting system as recited in claim 1, wherein said input and output shafts are coaxial.

3. A motion transmitting system comprising:

an input shaft and an output shaft;

said output shaft comprising a cup-like part and a spaced, rigidly connected sleeve part, said sleeve part surrounding and supporting said input shaft and said input shaft also being supported by said cup-like part;

a first eccentric connected to said input shaft for rotation therewith;

a first sprocket rotatable with and freely rotatable on said first eccentric, said first sprocket having a plurality of teeth with tooth spaces therebetween, said tooth spaces being defined primarily by a segment of a circle;

a second eccentric axially adjacent to said first eccentric and being connected to said input shaft for rotation therewith;

a second sprocket freely rotatable on said second eccentric and spaced axially from said first sprocket, said second sprocket having a plurality of teeth with tooth spaces therebetween, the spaces being defined primarily by a segment of a circle;

said sprockets having a plurality of circular holes therethrough;

said first and second eccentrics being 180 degrees out of phase with one another;

a pair of fixed and spaced plates, each defining a plurality of substantially equally spaced circular openings, each opening being substantially equidistant from the axis of rotation of said input shaft;

a plurality of generally cylindrical reaction means, each reaction means being circular in cross-section and being held in captive relationship in a pair of opposed circular openings for engagement by sprocket tooth spaces, each circular opening having a diameter permitting said reaction means to rotate about their axes while rolling in a circular path in said ciruclar openings, thereby permitting the distance between the axes of adjacent reaction means to vary during reactive engagement with said first and second sprockets, the number of reaction means exceeding the number of sprocket tooth spaces on each sprocket by at least one, the eccentric rotation of said sprockets permitting some of said sprocket tooth spaces to engage a like number of reaction means and thus impart rotary motion to said sprockets about said eccentrics; and means connecting said sprockets and said output shaft to translate the motion of said sprockets to rotary motion of said output shaft, said means comprising means connecting said cup-like output shaft part and said sleeve part and passing through said holes in said sprockets.

4. A motion transmitting system as recited in claim 3, in which said input and output shafts are coaxial.

* * * * *